US011916298B2

(12) United States Patent
Zhang et al.

(10) Patent No.: US 11,916,298 B2
(45) Date of Patent: Feb. 27, 2024

(54) PATCH ANTENNA

(71) Applicant: CommScope Technologies LLC, Hickory, NC (US)

(72) Inventors: Xun Zhang, Suzhou (CN); Bo Wu, Suzhou (CN); Hangsheng Wen, Suzhou (CN); Zhigang Wang, Suzhou (CN); Jian Zhang, Suzhou (CN); Ligang Wu, Suzhou (CN)

(73) Assignee: CommScope Technologies LLC, Claremont, NC (US)

( * ) Notice: Subject to any disclaimer, the term of this patent is extended or adjusted under 35 U.S.C. 154(b) by 212 days.

(21) Appl. No.: 17/621,623

(22) PCT Filed: Jul. 10, 2020

(86) PCT No.: PCT/US2020/041479
§ 371 (c)(1),
(2) Date: Dec. 21, 2021

(87) PCT Pub. No.: WO2021/015961
PCT Pub. Date: Jan. 28, 2021

(65) Prior Publication Data

US 2022/0359995 A1 Nov. 10, 2022

(30) Foreign Application Priority Data

Jul. 19, 2019 (CN) ......................... 201910652414.5

(51) Int. Cl.
*H01Q 21/06* (2006.01)
*H01Q 3/26* (2006.01)
(Continued)

(52) U.S. Cl.
CPC ........... *H01Q 21/065* (2013.01); *H01Q 3/267* (2013.01); *H01Q 9/0414* (2013.01); *H01Q 21/0075* (2013.01)

(58) Field of Classification Search
CPC .... H01Q 21/065; H01Q 3/267; H01Q 9/0414; H01Q 21/0075; H01Q 1/38; H01Q 1/48; H01Q 1/50
See application file for complete search history.

(56) References Cited

U.S. PATENT DOCUMENTS

2009/0256752 A1 10/2009 Akkermans et al.
2010/0073238 A1 3/2010 Jun et al.
(Continued)

FOREIGN PATENT DOCUMENTS

FR 2919433 A1 1/2009
KR 101854309 B1 5/2018
(Continued)

OTHER PUBLICATIONS

"International Search Report and Written Opinion of the International Searching Authority", International Application No. PCT/US2020/041479, dated Sep. 25, 2020, 13 pp.
(Continued)

*Primary Examiner* — Seung H Lee
(74) *Attorney, Agent, or Firm* — Myers Bigel, P.A.

(57) ABSTRACT

A patch antenna comprises a multilayer printed circuit board that includes a calibration network, an array of patch radiators and a feed network. In some embodiments, the multilayer printed circuit board includes a plurality of dielectric substrates, wherein the array of patch radiators is provided on a dielectric substrate different from the dielectric substrate on which the calibration network is provided, and the dielectric substrate provided with the array of patch radiators is provided above the dielectric substrate provided with the calibration network.

8 Claims, 6 Drawing Sheets

(51) Int. Cl.
*H01Q 9/04* (2006.01)
*H01Q 21/00* (2006.01)

(56) References Cited

U.S. PATENT DOCUMENTS

| | | | | |
|---|---|---|---|---|
| 2015/0084826 | A1 | 3/2015 | Lea et al. | |
| 2017/0346182 | A1 | 11/2017 | Martikkala et al. | |
| 2019/0123443 | A1 | 4/2019 | Russell et al. | |
| 2020/0373673 | A1* | 11/2020 | Hashemi | H01Q 21/0025 |

FOREIGN PATENT DOCUMENTS

| | | | |
|---|---|---|---|
| WO | 2005107014 | A1 | 11/2005 |
| WO | 2016065859 | A1 | 5/2016 |

OTHER PUBLICATIONS

"European Search Report in Corresponding Application No. 20844666.6, dated Jun. 15, 2023, 19 pages".

* cited by examiner

PATCH ANTENNA

CROSS-REFERENCE TO RELATED APPLICATIONS

The present application is a 35 U.S.C. § 371 national stage application of PCT Application No. PCT/US2020/041479, filed on Jul. 10, 2020, which itself claims priority to Chinese Patent Application No. 201910652414.5, filed Jul. 19, 2019, the entire contents of both of which are incorporated herein by reference as if set forth fully herein in their entireties.

FIELD

The present invention relates to radio communications. More specifically, the present invention relates to patch antennas and, in particular, to integrated patch antennas.

BACKGROUND

Compared to metal waveguides, microstrip transmission lines have the advantages of small volume, light weight, wide bandwidth, high reliability and low manufacturing cost. With the development of dielectric materials that are low-loss at microwave frequencies, microstrip transmission line-based microstrip antennas have been widely applied.

A patch antenna typically includes a dielectric substrate, an array of patch radiators, a feed network, other microstrip integrated circuits and the like. Currently, with the rapid development of large-scale Multiple-Input Multiple-Output (MIMO) technology, more microstrip integrated circuits need to be integrated in a limited space. Therefore, how to achieve high integration and miniaturization of the overall antenna construction has been a technical problem urgently to be solved by those skilled in the art in the recent years.

SUMMARY

According to a first aspect of the present invention, a patch antenna is provided. The patch antenna comprises a multilayer printed circuit board, wherein a calibration network for the patch antenna, an array of patch radiators and a feed network for the array of patch radiators are integrated on the multilayer printed circuit board.

The integrated patch antenna in accordance with the embodiments of the present invention is advantageous: in the patch antenna, the array of patch radiators, the feed networks, and the calibration networks are integrated on a single multi-layer printed circuit board, which facilitates a simple electrical connection therebetween, enabling the integration and miniaturization of the patch antenna.

In some embodiments, the multilayer printed circuit board includes a plurality of dielectric substrates, wherein the array of patch radiators is provided on a dielectric substrate different from the dielectric substrate on which the calibration network is provided, and the dielectric substrate provided with the array of patch radiators is provided above the dielectric substrate provided with the calibration network.

In some embodiments, the multilayer printed circuit board includes a first dielectric substrate and a second dielectric substrate underneath the first dielectric substrate, the first and second dielectric substrates each having an upper major surface and a lower major surface opposite the upper major surface, wherein a first metal pattern is provided on the upper major surface of the first dielectric substrate, wherein the first metal pattern comprises the array of patch radiators, and a second metal pattern is disposed on the lower major surface of the second dielectric substrate, wherein the second metal pattern comprises the calibration network.

In some embodiments, the first metal pattern comprises a first feed network for the array of patch radiators.

In some embodiments, the second metal pattern comprises a second feed network for the array of patch radiators.

In some embodiments, the second metal pattern further comprises a coupler configured to electrically couple the calibration network to the second feed network.

In some embodiments, a first ground metal layer is provided between the first dielectric substrate and the second dielectric substrate.

In some embodiments, the second feed network is electrically connected to the first feed network by conductive elements that pass through the second dielectric substrate, the first ground metal layer and the first dielectric substrate.

In some embodiments, the multilayer printed circuit board further comprises a third dielectric substrate having an upper major surface and a lower major surface opposite the upper major surface, and the third dielectric substrate is disposed underneath the second dielectric substrate, wherein a second ground metal layer is provided on the lower major surface of the third dielectric substrate.

In some embodiments, the patch antenna further comprises a fourth dielectric substrate disposed above the multilayer printed circuit board, and an array of parasitic patch radiators is provided on the fourth dielectric substrate.

In some embodiments, the fourth dielectric substrate is mechanically connected to the multilayer printed circuit board via a connection device.

In some embodiments, the calibration network includes a calibration port, by which calibration signals are allowed to be electrically coupled to the second feed network via corresponding signal transmission lines, power dividers, and couplers.

In some embodiments, the first metal pattern comprises a tuning line, two ends of the tuning line being electrically connected to one end of a corresponding transmission line in the calibration network via corresponding conductive elements respectively.

In some embodiments, the multilayer printed circuit board includes, from top to bottom, a first dielectric substrate, a second dielectric substrate, a third dielectric substrate and a fourth dielectric substrate, each of the dielectric substrates having an upper major surface and a lower major surface opposite the upper major surface.

In some embodiments, the array of patch radiators is disposed on the upper major surface of the first dielectric substrate, wherein a first ground metal layer is provided between the first dielectric substrate and the second dielectric substrate, wherein a first metal pattern is provided between the second dielectric substrate and the third dielectric substrate, wherein the first metal pattern comprises a first feed network for the array of patch radiators, and a second metal pattern is provided between the third dielectric substrate and the fourth dielectric substrate, wherein the second metal pattern comprises the calibration network.

In some embodiments, the second metal pattern comprises a second feed network for the array of patch radiators.

In some embodiments, the second metal pattern comprises a coupler, the coupler being configured to electrically couple the calibration network to the second feed network.

In some embodiments, the second feed network is electrically connected to the first feed network by passing through the third dielectric substrate via corresponding conductive elements.

In some embodiments, a second ground metal layer is disposed on the lower major surface of the fourth dielectric substrate.

In some embodiments, the multilayer printed circuit board includes, from top to bottom, a first dielectric substrate, a second dielectric substrate, a third dielectric substrate, a fourth dielectric substrate and a fifth dielectric substrate, each of the dielectric substrates having an upper major surface and a lower major surface opposite the upper major surface.

In some embodiments, the array of patch radiators is provided on the upper major surface of the first dielectric substrate, wherein a first ground metal layer is provided between the first dielectric substrate and the second dielectric substrate, wherein a first metal pattern is provided between the second dielectric substrate and the third dielectric substrate, wherein the first metal pattern comprises a first feed network for the array of patch radiators, wherein a second ground metal layer is provided between the third dielectric substrate and the fourth dielectric substrate, and wherein a second metal pattern is provided between the fourth dielectric substrate and the fifth dielectric substrate, wherein the second metal pattern comprises the calibration network.

In some embodiments, the second metal pattern comprises a second feed network for the array of patch radiators.

In some embodiments, the second metal pattern comprises a coupler, the coupler being configured to electrically couple the calibration network to the second feed network.

In some embodiments, the second feed networks are electrically connected to the first feed networks by conductive elements that pass through the fourth dielectric substrate, the second ground metal layer and the third dielectric substrate.

In some embodiments, a third ground metal layer is provided on the lower major surface of the fifth dielectric substrate.

According to a second aspect of the present invention, a patch antenna is provided. The patch antenna comprises a multilayer printed circuit board that includes at least first and second dielectric substrates wherein an array of patch radiators is provided on the first dielectric substrate and a calibration network for the patch antenna is provided on the second dielectric substrate, where the first dielectric substrate is disposed above the second dielectric substrate, the multilayer printed circuit board further including a first feed network for the array of patch radiators.

In some embodiments, a second feed network is further provided on the second dielectric substrate, the second feed network being electrically coupled to the calibration network via couplers.

In some embodiments, the calibration network and the second feed network each comprise stripline transmission lines.

In some embodiments, the calibration network and the second feed network each comprise microstrip transmission lines.

In some embodiments, the first feed network comprises stripline transmission lines and/or microstrip transmission lines.

DETAILED DESCRIPTION

Figure 1:
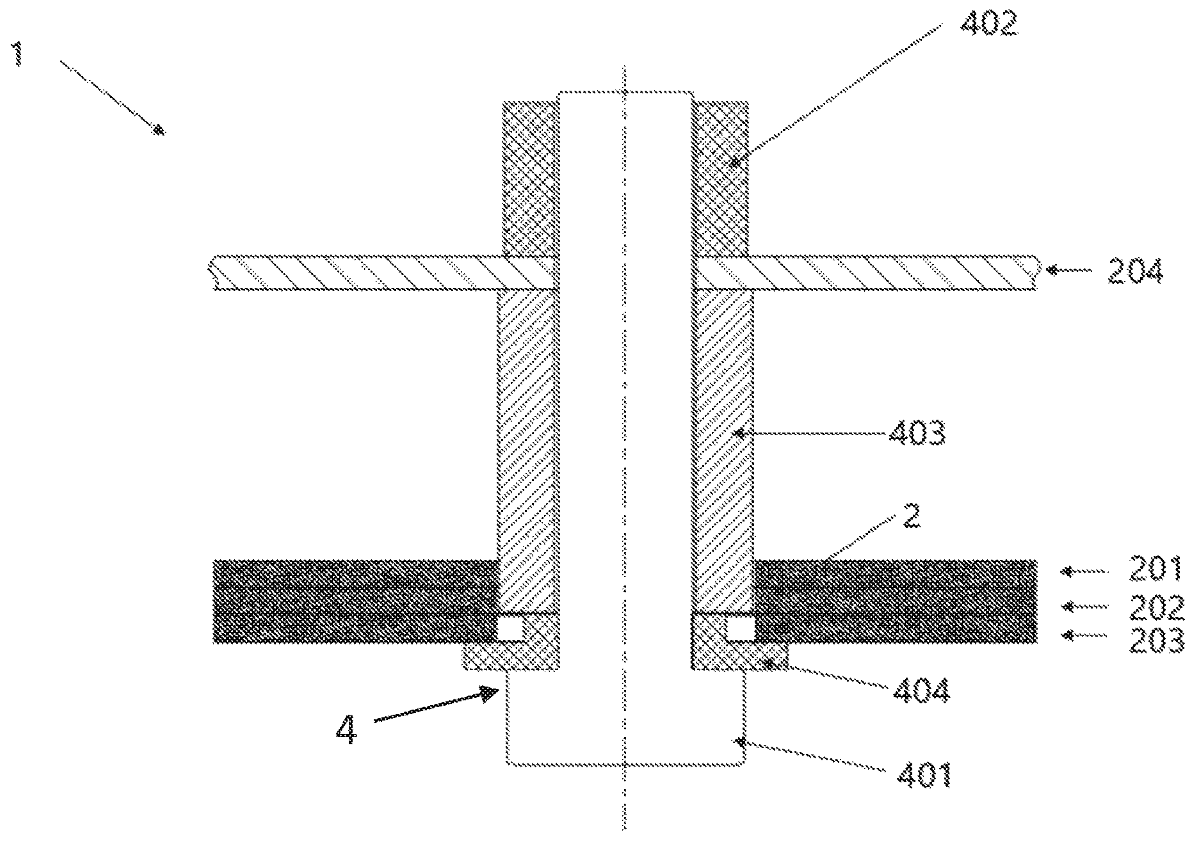
FIG. 1 is a schematic side view of a patch antenna according to a first embodiment of the present invention.

Embodiments of the present invention will be described below with reference to the drawings, in which several embodiments of the present invention are shown. It should be understood, however, that the present invention may be implemented in many different ways, and is not limited to the example embodiments described below. In fact, the embodiments described hereinafter are intended to make a more complete disclosure of the present invention and to adequately explain the scope of the present invention to a person skilled in the art. It should also be understood that, the embodiments disclosed herein can be combined in various ways to provide many additional embodiments.

It should be understood that, the wording in the specification is only used for describing particular embodiments and is not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the relevant items listed.

In the specification, words describing spatial relationships such as "up", "down", "left", "right", "forth", "back", "high", "low" and the like may describe a relation of one feature to another feature in the drawings. It should be understood that these terms also encompass different orientations of the apparatus in use or operation, in addition to encompassing the orientations shown in the drawings. For example, when the apparatus in the drawings is turned over, the features previously described as being "below" other features may be described to be "above" other features at this time. The apparatus may also be otherwise oriented (rotated 90 degrees or at other orientations) and the relative spatial relationships will be correspondingly altered.

It will be understood that, although the terms first, second, etc. may be used herein to describe various elements, these elements should not be limited by these terms. These terms are only used to distinguish one element from another. For example, a first element may be termed a second element, and, similarly, a second element may be termed a first element without departing from the scope of the present invention. The wording "and/or" as used herein includes any and all combinations of one or more of the relevant items listed.

It should be understood that, when an element is referred to as being "on" another element, it can be directly on the other element or intervening elements may also be present.

In contrast, when an element is referred to as being "directly on" another element, there are no intervening elements present. It should also be understood that, when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present. Other words used to describe the relationship between elements should be interpreted in a similar manner (i.e., "between . . . " and "directly between . . . ", "adjacent" and "directly adjacent", etc.).

It should be understood that, in all the drawings, the same reference signs present the same elements. In the drawings, for the sake of clarity, the sizes of certain features may be modified.

In large-scale multi-input and multi-output (Massive MIMO) antennas and/or in beamforming antennas, due to uncontrollable errors in the design, manufacture or use of RF control systems (such as an RRU) or other antenna networks, an additional circuit is typically required to compensate for phase and/or amplitude differences that are imparted by the antenna to RF signals that are input at different RF ports. This process is often referred to as "calibration."

Typically, the patch radiators and the feed networks therefor may be integrated on a first printed circuit board, while the calibration device is formed on a second, separate printed circuit board. The calibration device may comprise, for example, a dielectric substrate, microstrip calibration circuits disposed on an upper major surface of the dielectric substrate, and a ground metal layer disposed on a lower major surface of the dielectric substrate. In other cases, the calibration circuit may be implemented in a printed circuit board that includes two stacked dielectric substrates, where ground metal layers are disposed on the upper surface of the top dielectric substrate and the lower surface of the bottom dielectric substrate, and the calibration circuits are disposed in a metal layer that is between the two dielectric substrates. In either of the above cases, additional connecting means, such as screws, are required to securely connect the second printed circuit board that includes the calibration device to the first printed circuit board that includes the patch radiators.

In order to calibrate the antenna, conductive elements are needed to connect the microstrip calibration circuits on the calibration device with the feed network for the patch radiators. Thus, the design of the antenna system may become large and/or complicated. There is therefore a need to improve the integration and miniaturization of the overall antenna system.

Next, a specific configuration of a patch antenna according to embodiments of the present invention will be described in detail with reference to the accompanying drawings.

FIG. 1 is a schematic side view of a patch antenna according to a first embodiment of the present invention. As shown in FIG. 1, the patch antenna 1 includes a multilayer printed circuit board 2. In the embodiment of FIG. 1, the multilayer printed circuit board 2 may include four metal layers (such as copper layers) that are separated by three dielectric substrates, namely, a first dielectric substrate 201, a second dielectric substrate 202, and a third dielectric substrate 203 from top to bottom. Further, the patch antenna 1 may also include a fourth dielectric substrate 204 that is spaced apart from the multilayer printed circuit board 2. An array of parasitic metal patch radiators may be disposed on the fourth dielectric substrate 204, and these parasitic patch radiators are configured to be electrically floating and function to expand the operating bandwidth of the patch radiators of the patch antenna 1. Additionally, the patch antenna 1 further comprises a connection device 4 including a bolt 401, a nut 402, a sleeve 403 and a washer 404. The connecting device 4 is configured to fix the multilayer printed circuit board 2 and the fourth dielectric substrate 204 together.

Next, the multilayer printed circuit board 2 of the patch antenna according to the first embodiment of the present invention will be explained in detail with reference to FIGS. 2, 3*a*, 3*b* and 4.

Figure 2:
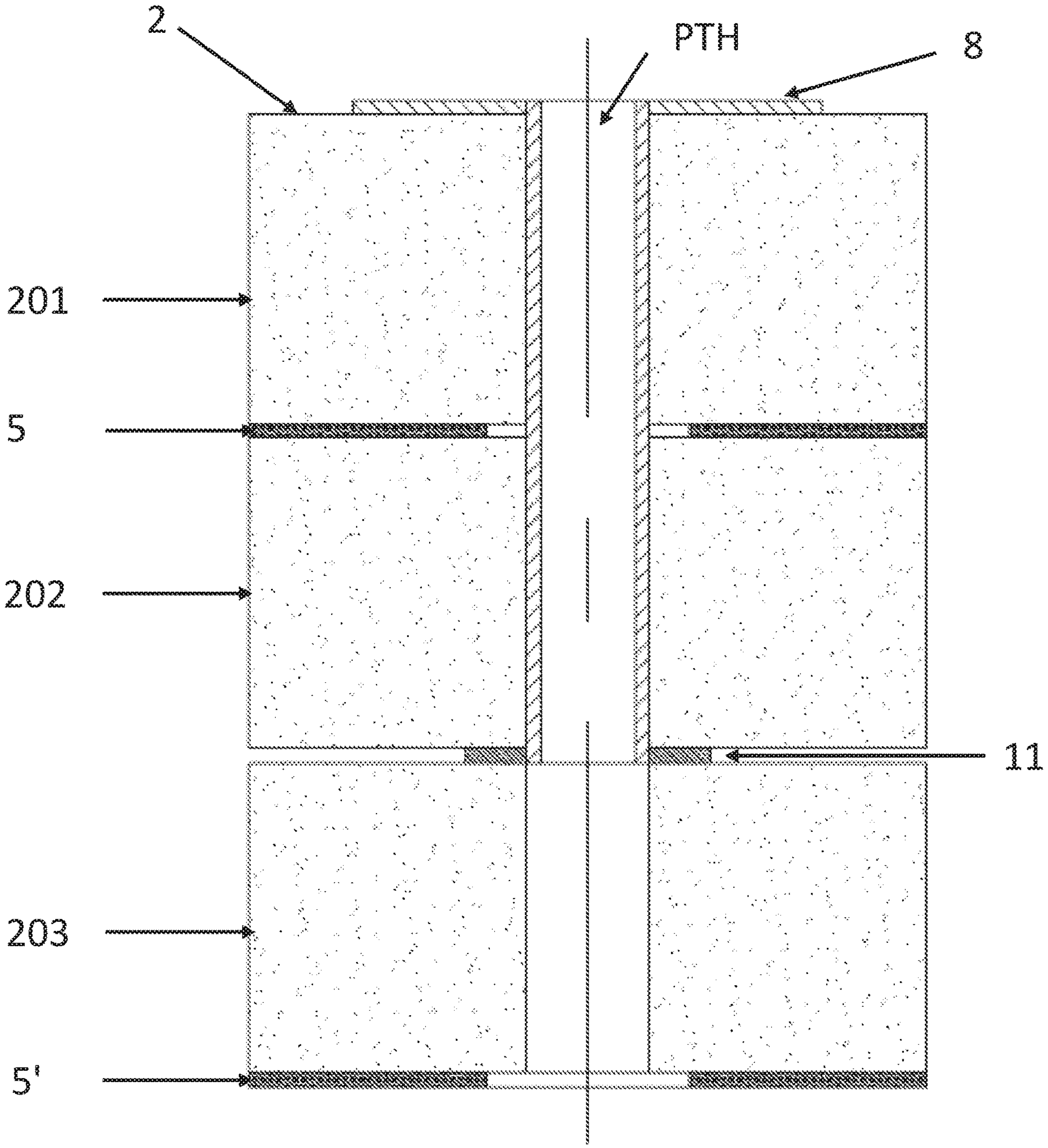
FIG. 2 is a schematic side view of a multilayer printed circuit board of the patch antenna of FIG. 1.

FIG. 2 is a schematic side view of the multilayer printed circuit board 2 of the patch antenna 1 according to the first embodiment of the present invention. As shown in FIG. 2, the multilayer printed circuit board 2 includes, from top to bottom, a first dielectric substrate 201, a second dielectric substrate 202, and optionally a third dielectric substrate 203. The dielectric substrates 201, 202, and 203 each have an upper major surface and a lower major surface opposite the upper major surface.

An array of patch radiators (not visible in FIG. 2) and a first feed network for the array of patch radiators (not visible in FIG. 2) may be provided on the upper major surface of the first dielectric substrate 201. A first ground metal layer 5 is provided between the first dielectric substrate 201 (the lower major surface thereof) and the second dielectric substrate 202 (the upper major surface thereof).

A calibration network (not visible in FIG. 2) may be disposed on the lower major surface of the second dielectric substrate 202. Further, the lower major surface of the second dielectric substrate 202 may also include a second feed network for the array of patch radiators (not visible in FIG. 2). As can be seen from FIG. 2, conductive patterns 11 (including the calibration network and the second feed network) on the second dielectric substrate 202 may be electrically connected with the first feed network on the first dielectric substrate 201 via conductive elements such as Plated Through Holes (PTHs) (which are schematically shown herein).

In the embodiment of FIG. 2, the third dielectric substrate 203 is provided underneath the second dielectric substrate 202. A second ground metal layer 5' is provided on the lower major surface of the third dielectric substrate 203. As a result, the calibration network and the second feed network on the lower major surface of the second dielectric substrate 202 are surrounded on both sides by the first and second ground metal layers 5, 5', whereby the calibration network and the second feed network are formed as a stripline transmission line network. Stripline transmission lines may be advantageous because they may exhibit reduced radiative signal losses and may shield the RF transmission line from external radiation.

In other embodiments, the calibration network and the second feed network on the lower major surface of the second dielectric substrate 202 may be configured as a microstrip transmission line network, and in this case no additional third dielectric substrate 203 is required. That is, the multilayer printed circuit board 2 in the patch antenna 1 according to the first embodiment of the present invention may only include the first dielectric substrate 201 and the second dielectric substrate 202, and the third dielectric substrate 203 is omitted.

Next, a specific embodiment of the multilayer printed circuit board 2 of FIGS. 1 and 2 will be described in detail with reference to FIGS. 3*a*, 3*b* and 4.

Figure 3A:
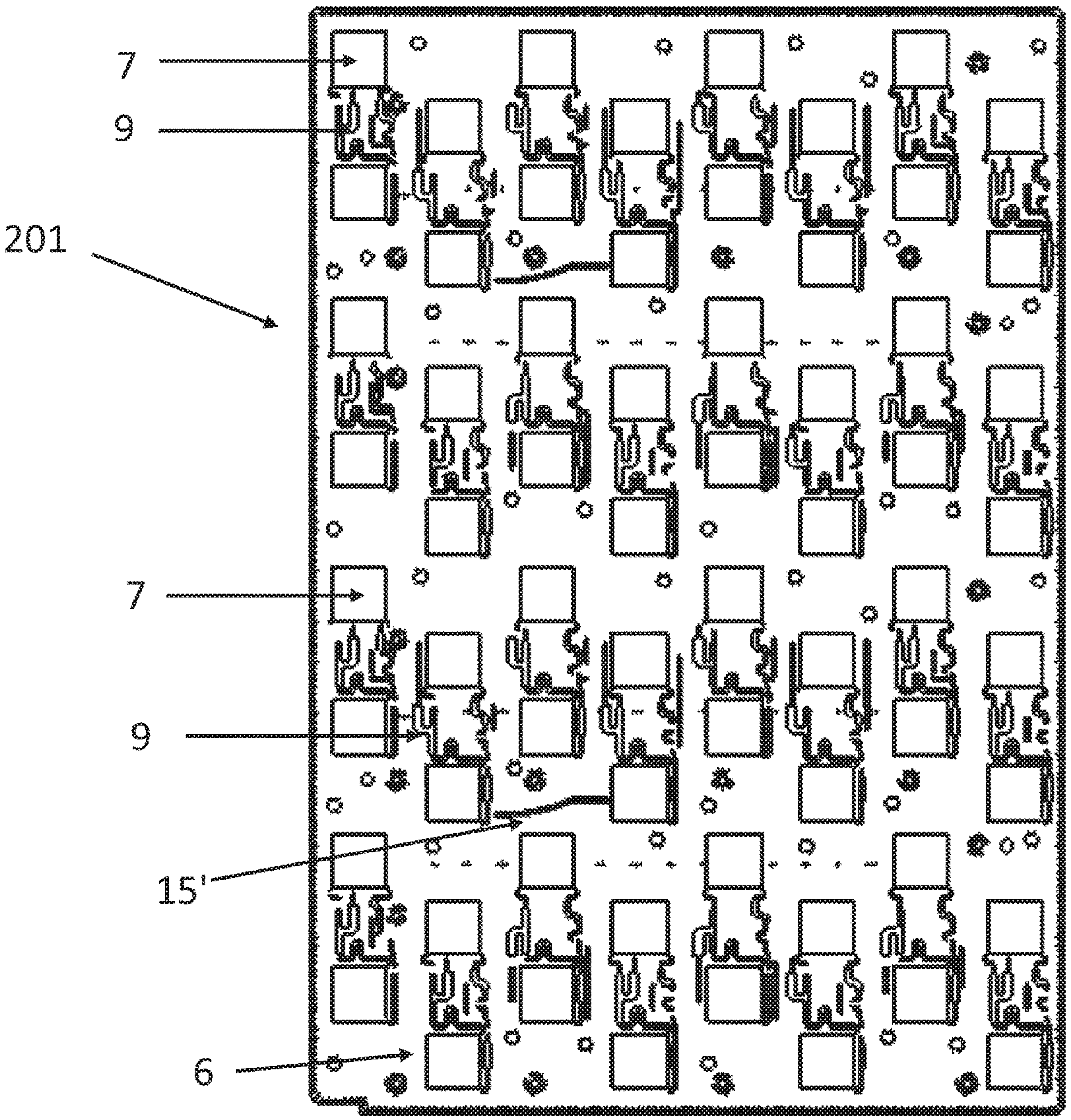
FIGS. 3*a* and 3*b* are schematic plan views that illustrate conductive patterns on the upper major surface of the first dielectric substrate in the multilayer printed circuit board of FIG. 2.
Figure 3B:
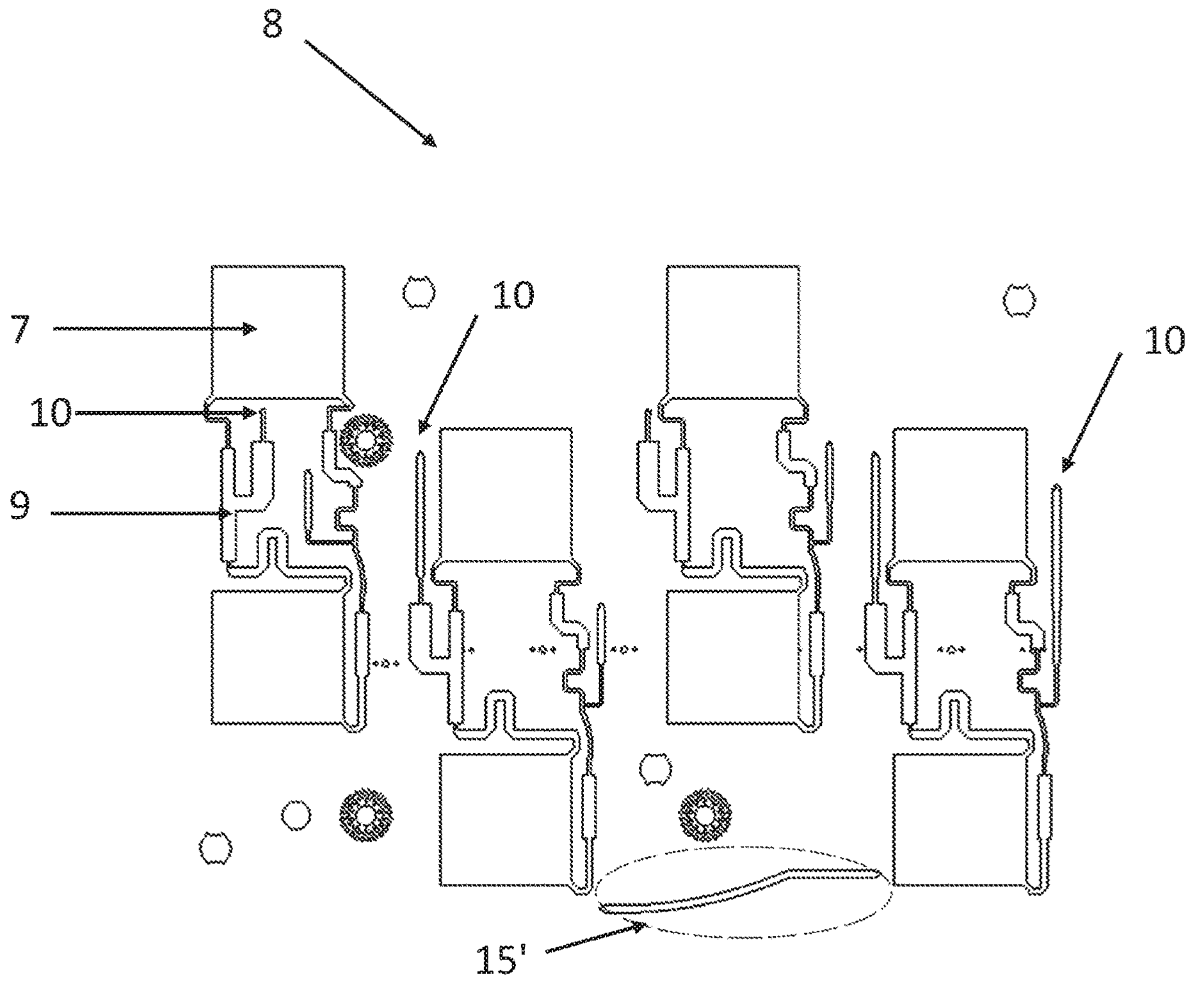

FIGS. 3*a* and 3*b* are schematic plan views that illustrate circuit diagrams of the conductive patterns on the upper major surface of the first dielectric substrate 201 in the multilayer printed circuit board 2 of FIGS. 1 and 2.

As shown in FIGS. 3*a* and 3*b*, a plurality of patch radiating elements 6 are formed on the first dielectric substrate 201. Each patch radiating element includes a metal patch radiator 7 disposed on the upper major surface of the first dielectric substrate 201, and a metal portion of the first ground metal layer 5 that corresponds to the patch radiator 7. The patch radiator 7 is constructed as part of the conductive patterns 8 on the upper major surface of the first dielectric substrate 201, and another part of the conductive patterns 8 may be configured as a first feed network 9 for passing RF signals to and from the corresponding patch radiators 7.

As shown in FIG. 3*b*, each patch radiator 7 may comprise a thin metal layer (e.g., a copper layer), and may have any appropriate shape including rectangular, square, circular, etc. In the embodiment of FIGS. 3*a* and 3*b*, each patch radiator 7 is configured as a square radiator, the length and width of which may each be about a half of a wavelength of a center frequency of the frequency band in which the patch radiator 7 is designed to operate.

As shown in FIGS. 3*a* and 3*b*, every two adjacent patch radiators 7 in a vertical direction may be constructed as a pair of commonly-fed patch radiators. The patch radiator 7 may be fed by means of cross feeding, for example, ±45° feeding. Specifically, in the conductive pattern 8 on the upper major surface of the first dielectric substrate 201, an RF signal from the upstream feed network reaches a corresponding connection terminal 10 in the first feed network 9, and then is transmitted from connection terminal 10 via a first length of a feed line and/or a transmission line, to a −45° feed end of one patch radiator 7 of a pair of patch radiators 7. At the same time, the RF signal is transmitted, from the same connection terminal 10 via a second length of the feed line and/or transmission line, to a −45° feed end of the other patch radiator 7 of the pair of patch radiators 7, wherein the first length and the second length may differ by about a half of the wavelength of the center frequency. This can improve the isolation between adjacent patch radiators 7. The feeding circuit for the +45° feed end of the patch radiator 7 is the same as the feeding circuit for the −45° feed end thereof, and thus will not be described herein.

A thickness and/or dielectric constant of the dielectric material of the first dielectric substrate 201 may be selected based on a desired width of the first feed network 9, as well as the desired bandwidth for the patch radiator 7. The first dielectric substrate 201 may further include, in addition to the patch radiator 7 and the first feed network 9, other functional elements such as a filter network or active elements (not shown here).

The first ground metal layer 5 may comprise a continuous or discontinuous metal layer (e.g., a copper layer) that is formed on the lower major surface of the first dielectric substrate 201. In some embodiments, the first ground metal layer 5 may include one or more openings therein. These openings may serve as PTHs that extend through the first ground metal layer 5 and the first dielectric substrate 201 to be coupled to the conductive pattern 8 on the upper major surface of the first dielectric substrate 201. The PTHs in the first ground metal layer 5 may also extend through the second dielectric substrate 202 to be coupled to the conductive pattern 11 on the lower major surface of the second dielectric substrate 202, which may comprise, for example, a calibration network 12 and/or a second feed network 13 as will be described in detail below.

Figure 4:
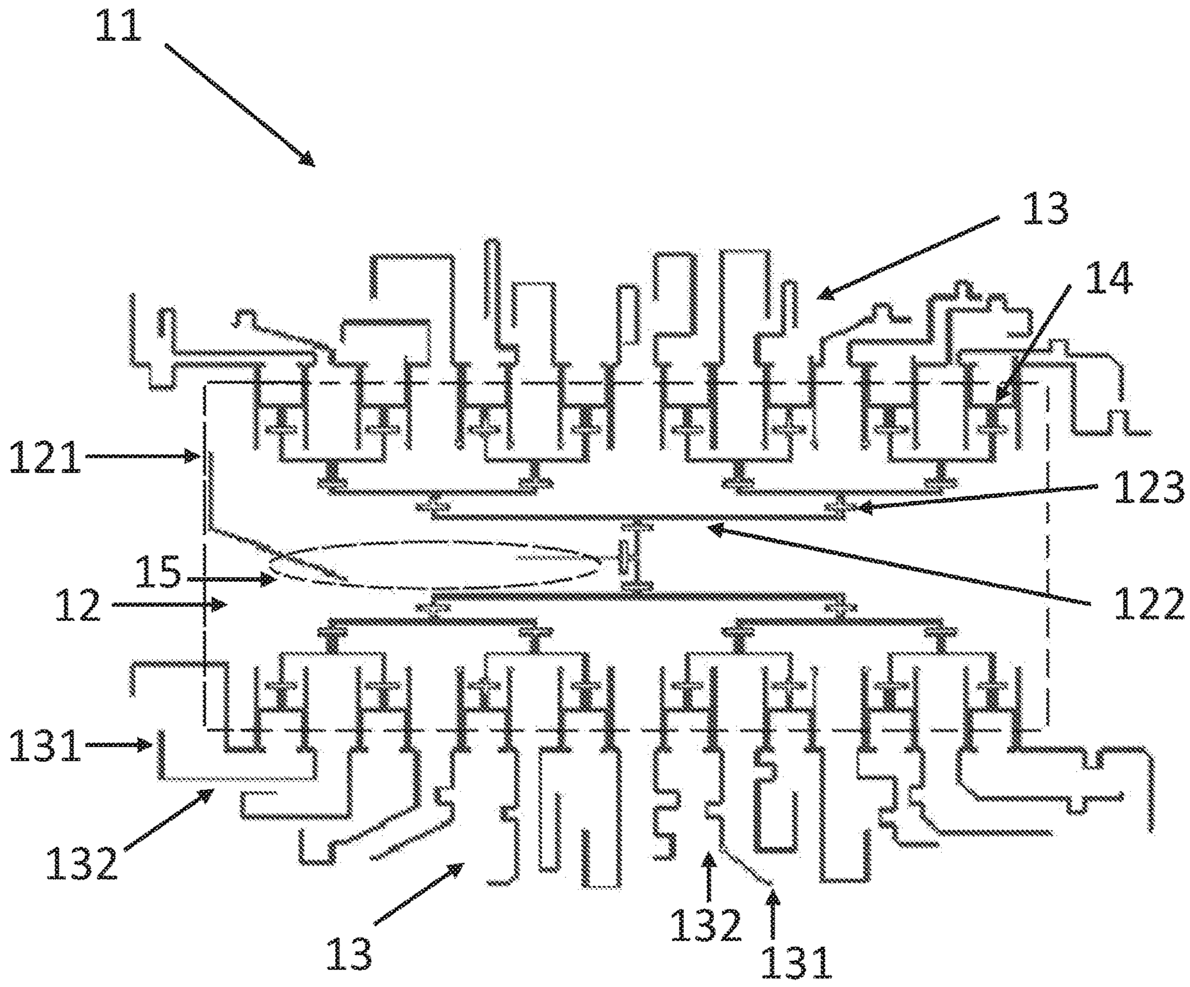
FIG. 4 is a schematic circuit diagram of a calibration network and a second feed network of the patch antenna of FIG. 1.

FIG. 4 is a schematic circuit diagram of the calibration network 12 and the second feed network 13 that are provided on the lower major surface of the second dielectric substrate 202 in the multilayer printed circuit board 2 of the patch antenna according to the first embodiment of the present invention.

As shown in FIG. 4, the calibration network 12, generally indicated by a dashed box, includes a calibration port 121 (or calibration ports), transmission lines 122, and power dividers 123. A remote radio unit (RRU) inputs calibration signals into the calibration port 121 via a cable. The calibration signals are transmitted, from the calibration port 121 via the corresponding transmission lines 122, power dividers 123 and couplers 14 in a multiplexing manner, to the respective feed branches in the second feed network 13 that are further electrically coupled to the first feed network 9 via conductive elements (such as PTHs). In the embodiment of FIG. 4, the couplers 14 are provided between the calibration network 12 and the second feed network 13, by means of which the calibration network 12 is electrically coupled to the second feed network 13, that is, the calibration signals are electrically coupled to the second feed network 13 via the couplers 14.

As shown in FIG. 4, the second feed network 13 may include RF ports 131 and transmission lines 132. The RRU reads the amplitude and/or phase of the RF signals that are electrically coupled from the calibration signal via the corresponding coupler 14 to the RF port 131. Thus, calibration of the RF control network can be implemented in terms of the S parameters of the RF ports 131 and the calibration port 121. In other words, calibration of the RF control network can be implemented in terms of the amplitude and/or phase of the RF signals on the RF ports 131 and the calibration port 121.

Further, the RRU may input RF signals into the corresponding RF ports 131. These RF signals are coupled, from the RF ports 131 via the corresponding transmission lines 132 and the PTHs extending through the second dielectric substrate 202, the first ground metal layer 5 and the first dielectric substrate 201, to the corresponding connection terminals 10 of the first feed network 13, thereby allowing the RF signals to be transmitted to the corresponding patch radiators. The calibration process may include the following steps:

First, the RRU transmits a calibration signal via a calibration network (a calibration port, a power division network and couplers) to each RF port 131. Then, the RRU reads the amplitude and/or phase of the RF signals on RF ports. Finally, based on the amplitudes and/or phases of the RF signals on the RF ports, the RRU performs calibration, that is, assigning different amplitude and/or phase weight values to the RF signals.

Further, as can be seen in combination with FIGS. 3*b* and 4, the calibration network 12 may include a "discontinuous" transmission line 15 (circled in FIG. 4), one end of which is connected to an end of a tuning line 15' (circled in FIG. 3*b*) on the upper surface of the first dielectric substrate 201 via a first PTH, and the other end of the tuning line 15' is connected to the other end of the "discontinuous" transmission line via a second PTH. The calibration network and the second feed network are configured as a stripline network in some embodiments. As test results of the patch antennas may differ due to the press-fit process and the tolerances of the materials, a tuning operation, such as impedance matching or return loss tuning, may be needed. Such tuning may be difficult to perform in the enclosed stripline calibration network, since the stripline calibration network includes ground metal layers on both sides and hence is not readily accessible by an operator. Since the tuning line 15' is constructed in the form of a microstrip transmission line on the upper surface of the first dielectric substrate 201, operators can easily access the tuning line 15', for example, may change a length, a width and the like of the tuning line 15' in order to, for example improve the impedance match, thus making it possible to carry out simple, high-efficient tuning.

Next, a patch antenna according to a second embodiment of the present invention will be explained with reference to FIG. 5.

Figure 5:
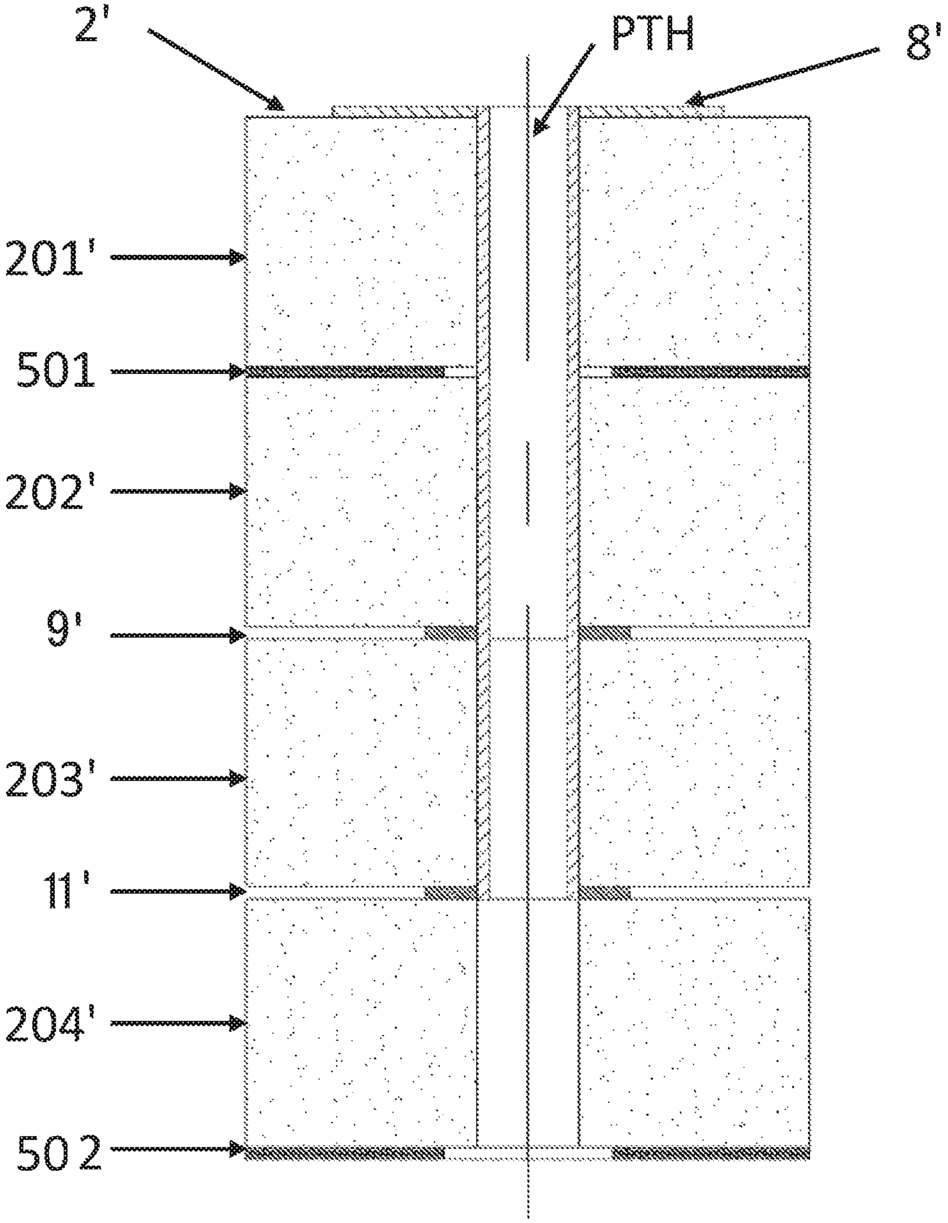
FIG. 5 is a schematic side view of a multilayer printed circuit board of a patch antenna according to a second embodiment of the present invention.

As shown in FIG. 5, the patch antenna includes a multilayer printed circuit board 2'. In the embodiment of FIG. 5, the multilayer printed circuit board 2' may include five metal layers and four layers of dielectric substrates, namely, a first dielectric substrate 201', a second dielectric substrate 202', a third dielectric substrate 203' and a fourth dielectric substrate 204' from top to bottom. The dielectric substrates 201', 202', 203' and 204' each have an upper major surface and a lower major surface opposite the upper major surface.

An array of patch radiators 8' may be disposed on the upper major surface of the first dielectric substrate 201'. A first ground metal layer 501 is provided between the first dielectric substrate 201' and the second dielectric substrate 202'. Unlike the first embodiment, a first feed network 9' for the array of patch radiators is provided between the second dielectric substrate 202' and the third dielectric substrate 203'. A conductive pattern 11' (including a calibration network and a second feed network) is provided between the third dielectric substrate 203' and the fourth dielectric substrate 204'. A second ground metal layer 502 may be disposed on the lower surface of the fourth dielectric substrate 204'.

In some embodiments, the first feed network 9' may be electrically connected to the corresponding arrays of patch radiators via PTHs. In some embodiments, the first feed network 9' may also be electrically connected to the corresponding arrays of patch radiators 8' by means of probes. The electrical connection by means of PTHs or probes is also applicable to the connection between the first feed network 9' and the second feed network 13'. Those skilled in the art may also envisage any other feasible way to achieve electrical connection between the conductive patterns on the respective layers.

In some embodiments, the multilayer printed circuit board 2' in FIG. 5 may also include a fifth dielectric substrate and a sixth metal layer. In such an embodiment, a ground metal layer may be provided between the third dielectric substrate and the fourth dielectric substrate, a calibration network and a second feed network may be provided between the fourth dielectric substrate and the fifth dielectric substrate, and an additional ground metal layer may be provided on the lower surface of the fifth dielectric substrate. Thus, the calibration network and the second feed network may be constructed as a stripline network.

It should be understood that the implementation modes of the patch antenna in accordance with the embodiments of the present invention may be varied, and the above-described embodiments are merely exemplary. Advantageously, arrays of patch radiators, feed networks and calibration networks are integrated in one multilayer printed circuit board of the patch antenna. In some embodiments, more functional networks may be integrated in the multilayer printed circuit board of the patch antenna, and the design, number, and position of the feed networks and calibration networks may be varied. The array of patch radiators may be provided on a dielectric substrate different from the dielectric substrate on which the feed networks and/or calibration networks are provided, and the dielectric substrate provided with the array of patch radiators may be disposed above the dielectric substrate provided with the feed networks and/or calibration networks.

The integrated patch antenna in accordance with the embodiments of the present invention is advantageous: in the patch antenna, the array of patch radiators, the feed networks, and the calibration networks are integrated on a single multi-layer printed circuit board, which facilitates a simple electrical connection therebetween, enabling the integration and miniaturization of the patch antenna.

Although the specific embodiments of the present disclosure have been described in detail by way of example, those skilled in the art should understand that the above examples are for illustrative purposes only and are not intended to limit the scope of the present disclosure. The various embodiments disclosed herein may be combined in any combination without departing from the spirit and scope of the disclosure. It should also be understood by those skilled in the art that various modifications may be made in the embodiments without departing from the scope and spirit of the disclosure.

That which is claimed is:

1. A patch antenna, comprising:

a multilayer printed circuit board, wherein a calibration network for the patch antenna, an array of patch radiators and a feed network for the array of patch radiators are integrated on the multilayer printed circuit board, wherein the multilayer printed circuit board includes, from top to bottom, a first dielectric substrate, a second dielectric substrate, a third dielectric substrate and a fourth dielectric substrate, each of the first through fourth dielectric substrates having an upper major surface and a lower major surface opposite the upper major surface, wherein the feed network for the array of patch radiators comprises a first feed network and a second feed network for the array of patch radiators, wherein the array of patch radiators is disposed on the upper major surface of the first dielectric substrate, wherein a first ground metal layer is provided between the first dielectric substrate and the second dielectric substrate, wherein a first metal pattern is provided between the second dielectric substrate and the third dielectric substrate, wherein the first metal pattern comprises the first feed network for the array of patch radiators, and a second metal pattern is provided between the third dielectric substrate and the fourth dielectric substrate, wherein the second metal pattern comprises the calibration network and the second feed network for the array of patch radiators.

2. The patch antenna according to claim 1, wherein the second metal pattern further comprises a coupler configured to electrically couple the calibration network to the second feed network.

3. The patch antenna according to claim 1, wherein the second feed network is electrically connected to the first feed network by conductive elements that pass through the second dielectric substrate, the first ground metal layer and the first dielectric substrate.

4. A patch antenna, comprising:

a multilayer printed circuit board that includes a first dielectric substrate and a second dielectric substrate, wherein a calibration network for the patch antenna, an array of patch radiators and a feed network for the array of patch radiators are integrated on the multilayer printed circuit board, wherein a first metal pattern is provided on an upper major surface of the first dielectric substrate, the first metal pattern comprising the array of patch radiators, and a second metal pattern is provided on a lower major surface of the second dielectric substrate, the second metal pattern comprising the calibration network, and wherein the patch antenna further comprises a fourth dielectric substrate disposed above the multilayer printed circuit board, and an array of parasitic patch radiators is provided on the fourth dielectric substrate.

5. A patch antenna, comprising:

a multilayer printed circuit board that includes a first dielectric substrate and a second dielectric substrate, wherein a calibration network for the patch antenna, an array of patch radiators and a feed network for the array of patch radiators are integrated on the multilayer printed circuit board, wherein a first metal pattern is provided on an upper major surface of the first dielectric substrate, the first metal pattern comprising the array of patch radiators, and a second metal pattern is provided on a lower major surface of the second dielectric substrate, the second metal pattern comprising the calibration network, and wherein the first metal pattern further comprises a tuning line, two ends of the tuning line being electrically connected to one end of a corresponding transmission line in the calibration network via corresponding conductive elements respectively.

6. The patch antenna according to claim 1, wherein the second metal pattern comprises a coupler, the coupler being configured to electrically couple the calibration network to the second feed network.

7. The patch antenna according to claim 1, wherein the second feed network is electrically connected to the first feed network by passing through the third dielectric substrate via corresponding conductive elements, and wherein a second ground metal layer is disposed on the lower major surface of the fourth dielectric substrate.

8. A patch antenna, comprising:

a multilayer printed circuit board that includes at least first and second dielectric substrates, wherein an array of patch radiators is provided on the first dielectric substrate and a calibration network for the patch antenna is provided on the second dielectric substrate, where the first dielectric substrate is disposed above the second dielectric substrate, the multilayer printed circuit board further including a first feed network for the array of patch radiators, wherein a second feed network is further provided on the second dielectric substrate, the second feed network being electrically coupled to the calibration network via couplers.

* * * * *